July 13, 1954   E. MARTENSON ET AL   2,683,594
GRAIN DRYING MACHINE

Filed Dec. 13, 1951   2 Sheets-Sheet 1

Eugene Martenson
Harvey J. Davis
INVENTORS.

July 13, 1954  E. MARTENSON ET AL  2,683,594
GRAIN DRYING MACHINE

Filed Dec. 13, 1951  2 Sheets-Sheet 2

Eugene Martenson
Harvey J. Davis
INVENTORS.

Patented July 13, 1954

2,683,594

UNITED STATES PATENT OFFICE 2,683,594

GRAIN DRYING MACHINE

Eugene Martenson and Harvey J. Davis,
Rolette, N. Dak.

Application December 13, 1951, Serial No. 261,528

1 Claim. (Cl. 263—33)

Our invention relates to improvements in grain drying machines for small grain, especially oats, wheat, rye, barley and corn.

The primary object of our invention is to provide an efficient portable machine for removing, under the action of heat a sufficient amount of moisture from such grain to prevent molding, but, without damaging the grain as regards germination, color, odor, or taste.

Another object is to accomplish the above while agitating the grain so that it will be uniformly but slowly dried under the action of heat at a low temperature.

Still another object is to provide a machine for the above purposes which is economical to manufacture, use and service, and easily cleaned.

Further and subordinate objects, within the purview of our invention, together with the precise nature of our improvements will be readily understood when the succeeding description and claim are read with reference to the drawings accompanying and forming part of this specification.

Figure 1:
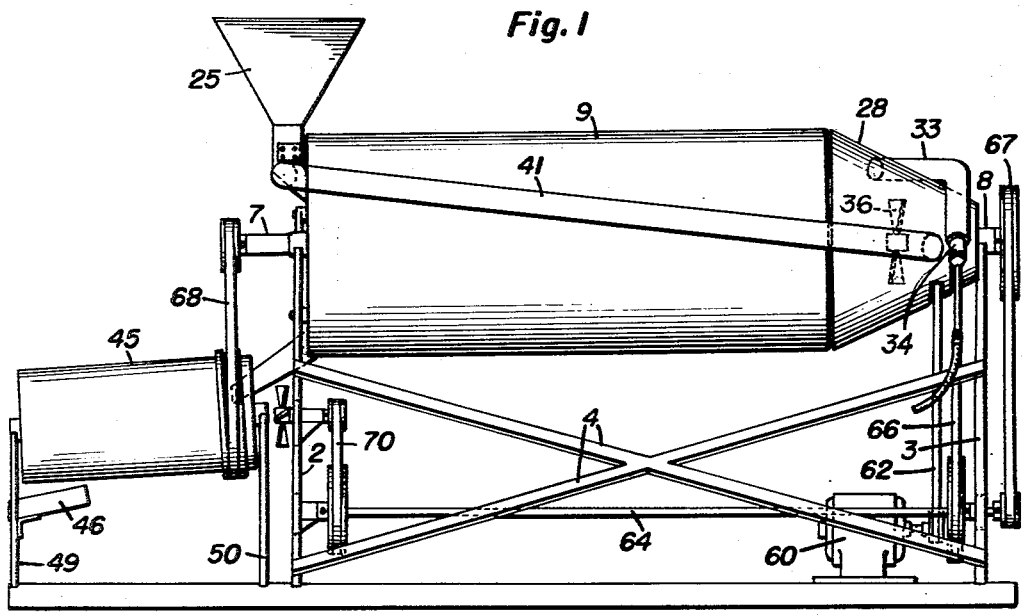
Figure 1 is a view in side elevation of our improved machine in the preferred embodiment thereof.
Figure 2:
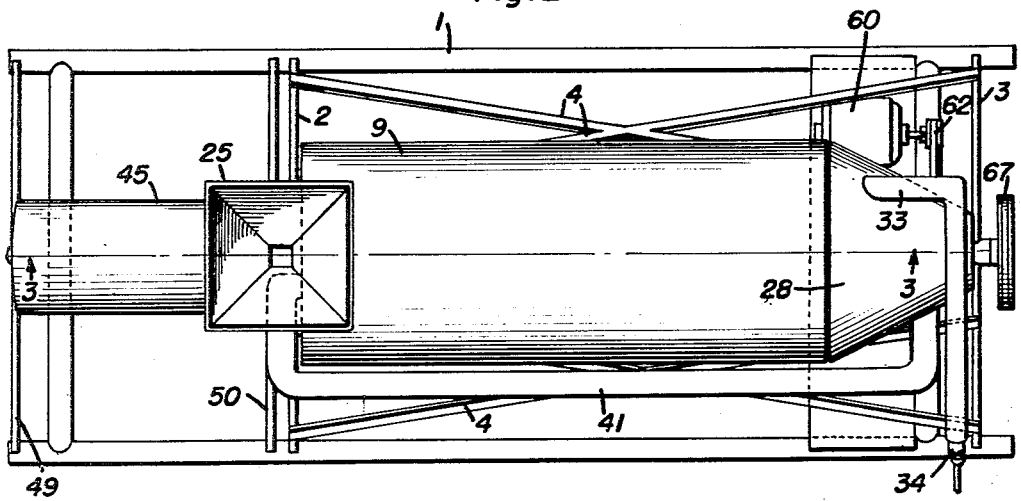
Figure 2 is a view in plan.

Referring to the drawings by numerals, our improved drying machine, as illustrated, comprises an elongated skeleton, rectangular base 1 of tubular material on which a pair of upstanding bearing brackets 2, 3 are suitably fixed and spaced longitudinally thereof for a purpose presently clear. Diagonal crossed bars 4 at opposite sides of the brackets 2, 3 brace the same. A horizontal driven shaft 6 is journalled in upper central bearings 7, 8 on said brackets 2, 3 and an outer cylindrical grain drying and agitating shell 9, of sheet metal, is fixed on said shaft 6 concentrically thereof between said brackets 2, 3 by spokes 10 in said shell radiating from hubs 11 fastened by pins 12 on said shaft 6. The outer shell is open at its ends, provided with longitudinal, internal, circumferentially spaced agitating fins 13, and together with the driven shaft 6 inclined slightly from the horizontal downwardly toward one end of said shaft and cylinder.

At the lower end of the shell 9, hereinafter referred to as the discharge end 14 thereof, said shell is closed by and rotates around a closure disc 15 bolted, as at 16, to the adjacent bracket 2. A grain discharge spout 17 inclined downwardly and outwardly from the discharge end 14 of said shell 9 at the bottom thereof and from a discharge opening 18 in the closure disk 15 to which said spout is suitably fixed.

An inner grain drying and agitating shell 20 in the outer shell 9 is carried by and suitably fixed to the spokes 10 in the outer shell 9 concentrically of the latter to rotate therewith. The inner shell 20 flares with gradually increasing diameter from the discharge end 14 of the outer shell 9 whereby said shell 20 is provided with a smaller grain intake end 21 at the discharge end 14 of the outer shell 9, and with a larger discharge end 22 adjacent the other, higher end of the outer shell 9. The intake end 21 of the inner shell 20 is slightly spaced from the closure disc 15 for a purpose presently seen. Longitudinal, circumferentially spaced, internal fins 23 are provided in the inner shell 20 for agitating grain in a manner presently seen.

A gravity feed seed hopper 25 at the discharge end of the outer shell 9 is provided with a discharge spout 26 suitably extended through the closure disc 15 into the intake end 21 of the inner shell 20 above the driven shaft 6.

A frusto-conical shell 28 forming a combustion chamber 29 is interposed between the bracket 3 and the higher end of the outer shell 9 remote from the discharge end 14 of said shell. The frusto-conical shell 28 is provided with a smaller closure end 30 bolted to said bracket 3 so that said shell 28 is coaxial with the outer shell 9, flares towards said shell 9 with its larger end of the same diameter as said shell 9 and fitted close thereto with just sufficient clearance to permit rotation of said outer shell relative to said shell 28.

A burner pipe 33 extends into the top of the frusto-conical shell 28, which is to say into the combustion chamber 29, with a suitable gas burner 34 therein for burning propane, butane, or natural gas. Air inlet openings 35 are provided in the bottom of said shell 28 to admit air into the combustion chamber 29 for combustion purposes. The burner pipe 33 opens into the combustion chamber 29 at one side of the vertical center thereof and forwardly of a blower fan 36 in said chamber having a hub sleeve 37 freely rotatably on the driven shaft 6 between a hub collar 38 on said shaft 6 and the end 30 of said frusto-conical shell 28. A bearing bracket 39 in said shell 28 supports said shell 28 on the driven shaft 6 forwardly of the blower fan 36. A heat return pipe 41 extends from the upper portion of the discharge end 14 of the outer shell 9 to the frusto-conical shell 28 at the side of said shell 28 opposite the burner pipe 33, said pipe 41 discharging into the combustion chamber 29 in the rear of the blower fan 36 where said fan creates suction in said chamber 29. The gases are vented from the cylinders 9, 20 and from the combustion chamber 29 through the discharge opening 18. The heat return pipe 41 is suitably fixed at the discharge end 14 of the outer shell 9 to open into said shell 9 at said discharge end 14.

The discharge spout 17 projects into and discharges into one end of a horizontal cooling cylinder, or shell 45 inclining downwardly away from said spout 17 in vertical alignment with the outer shell 9 for gravity discharge into a disposal chute 46 for the grain. The cooling cylinder, or shell, 45 is mounted by end spiders 47 therein on an axial shaft 48 journaled in bearing brackets 49, 50 upstanding from the base 1, one of said brackets, 49, carrying the disposal chute 46 at the lower end of said cylinder or shell 45. A blower fan 52 beneath and behind the discharge spout 17 has a shaft 53 journaled horizontally in the bracket 2 so that said fan operates to blow atmospheric air into the higher end of the cooling cylinder or shell 45.

Driving means for the machine comprises the following: A suitably controlled electric motor 60 has its armature shaft 61 connected by a belt and pulley connection 62 to the hub sleeve 37 of the fan 36 for driving said fan. The electric motor 60 is suitably supported on the base 1. A horizontal power transmission shaft 64 is journalled in the bearing brackets 2, 3 and operated by the hub sleeve 37 through a reduction belt and pulley connection 65 from said sleeve to one end of said shaft 64. The power transmission shaft 64 operates the driven shaft 6 through a reduction belt and pulley drive connection 67 between one end of said shaft 64 and the end of the driven shaft 6 at the bearing 8, which is to say at one end of the frusto-conical shell 28. As will be understood, the driven shaft 6 rotates the outer and inner shells 9, 20. The end of the driven shaft 6 opposite its driven end is operatively connected to the cooling cylinder 45 to rotate the same by a reduction belt and pulley drive connection 68. Another belt and pulley connection 70 between the fan shaft 53 and the end of the power transmission shaft 64 opposite its driven end operatively connects said shaft 64 to said fan shaft 53 and fan 52.

Figure 3:
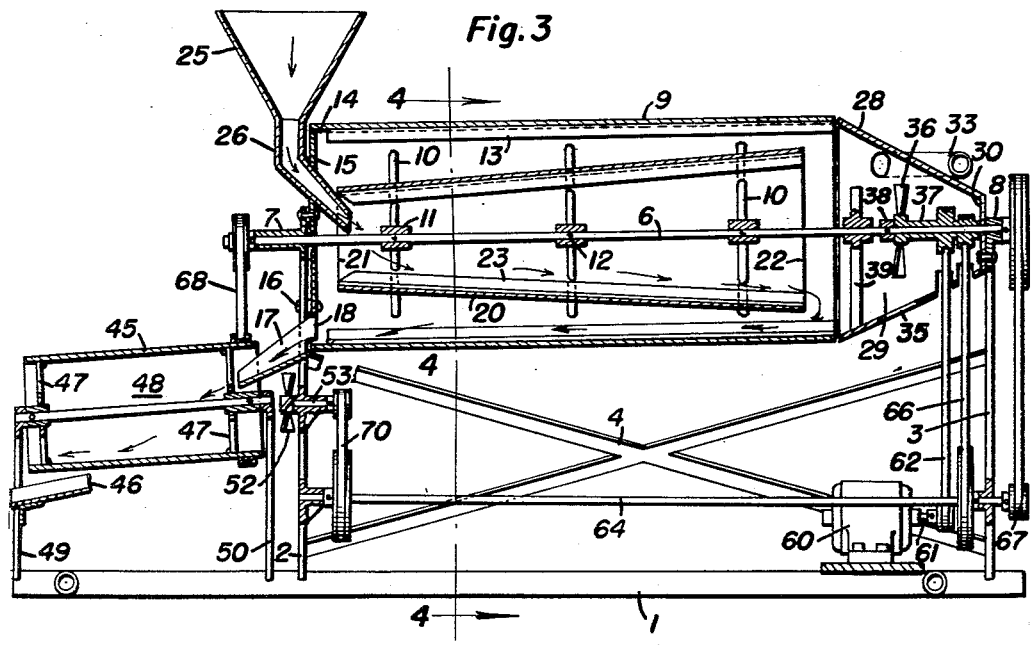
Figure 3 is a view in vertical longitudinal section taken on the line 3—3 of Figure 2.
Figure 4:
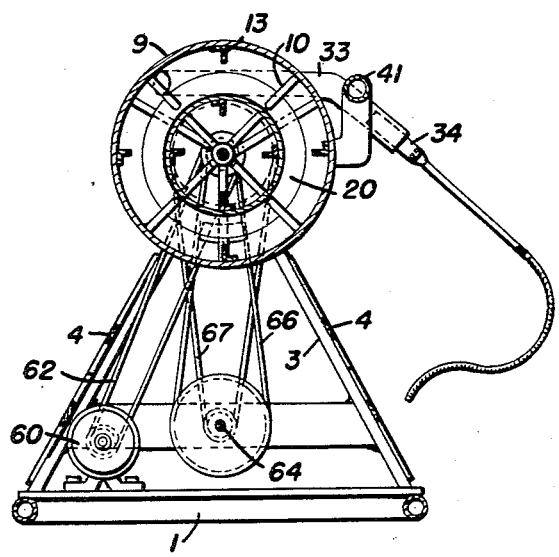
Figure 4 is a view in vertical transverse section taken on the line 4—4 of Figure 3.
Figure 5:
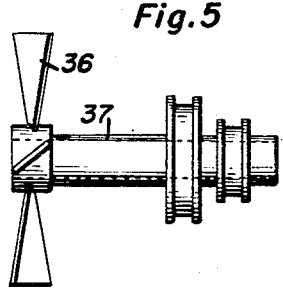
Figure 5 is an enlarged view in side elevation of the blower fan in the combustion chamber and the hub and sleeve of said fan.

The operation of the machine will be readily understood. With the burner 34 lighted and the motor 60 operating, the seed is deposited in the hopper 25 and discharges by gravity into the smaller intake end of the inner shell 20 in which it is agitated by centrifugal force and the agitating ribs 23 as the inner and outer shells 20, 9 are rotated. At the same time air heated in the combustion chamber 29 is blown by the blower fan 36 through both of said shells 20, 9. The seed feeds along the inner shell 20 under the influence of gravity to and out of the discharge end 22 of said shell and discharges into the higher end of the outer shell 9 where it is again agitated in the same manner as in the inner shell 23 and discharges under the influence of gravity out of the outer shell 9 at the discharge end 14 thereof into the discharge spout 17 from which it passes into the higher end of the cooling cylinder or shell 45. During its travel through the inner shell in one direction and its reverse travel through the outer shell 9, as indicated by the arrows in Figure 3, the seed while being agitated in both shells 20, 9 is subjected to the drying action of heated air blown into said shells by the fan 36 whereby the seed is dried to the desired degree uniformly. As will be understood, the burner 34 is of a suitable type for heating air in the combustion chamber 29 at a low temperature. In the cooling and agitating cylinder or shell 45, the grain is agitated by rotation of said cylinder or shell and cooled by a cool air blown through said shell or cylinder 45 by the fan 51, to issue out of the lower end of said cylinder or shell 45 into the disposal chute 46.

The foregoing will, it is believed, suffice to impart a clear understanding of our invention, without further explanation.

Manifestly, the invention, as described, is susceptible of modification without departing from the inventive concept, and right is herein reserved to such modifications as fall within the scope of the appended claim.

Having described the invention, what is claimed as new is:

In combination, an outer cylindrical shell inclined from the horizontal to provide relatively high and low grain receiving and discharge ends, respectively, whereby grain fed into the receiving end will discharge by gravity out of the discharge end, a coaxial relatively smaller and endwise flaring inner shell in said outer shell, flaring from the discharge end to the receiving end of the outer shell for gravity feed of grain through said inner shell into the receiving end of the outer shell, a rigidly mounted grain feed hopper at the discharge end of the outer shell feeding grain at said end into the inner shell, a rotary shaft extending axially through said shells with both shells fixed thereto for rotation by said shaft, a pair of vertical brackets rotatably supporting said shaft and shells in elevated position, a heat discharging combustion chamber on one of said brackets for introducing warm air into said shells opposed to the receiving end of the outer shell and flaring and opening toward the same for discharging thereinto and having said shaft extending therethrough with a blower fan fixed thereon in the chamber for rotation to discharge heat out of the chamber forwardly of the fan, and a warm air return line from the discharge end of the outer shell to the combustion chamber opening into said chamber in the rear of the fan.

References Cited in the file of this patent

UNITED STATES PATENTS

| Number | Name | Date |
| --- | --- | --- |
| 323,251 | Adt | July 28, 1885 |
| 879,206 | Snow | Feb. 13, 1908 |
| 2,038,008 | Shodron | Apr. 21, 1936 |
| 2,290,765 | Overman | July 21, 1942 |
| 2,319,673 | French | May 18, 1943 |
| 2,432,525 | Kruse | Dec. 16, 1947 |